Figure 15:
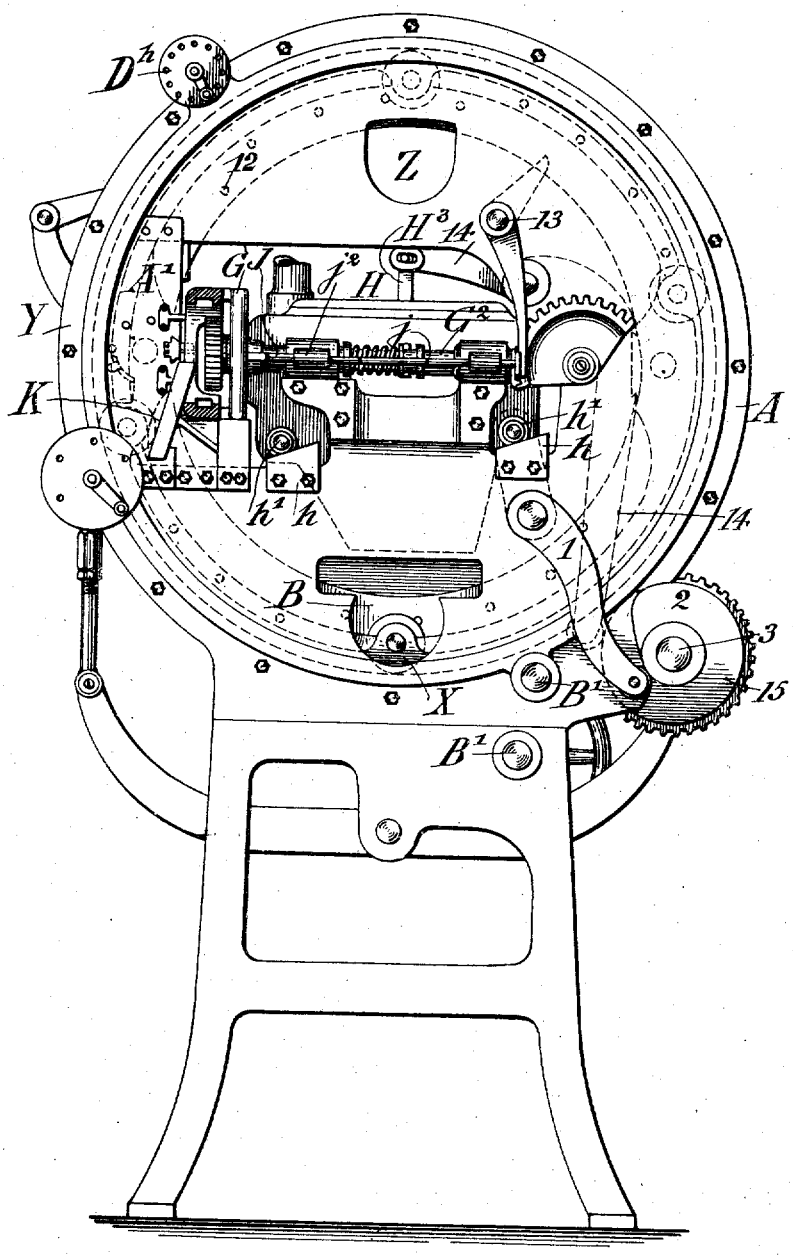

F. C. L. D'AIX.
LINE CASTING MACHINE.
APPLICATION FILED AUG. 20, 1908.
Reissued Dec. 7, 1909.
13,048.
11 SHEETS—SHEET 1.
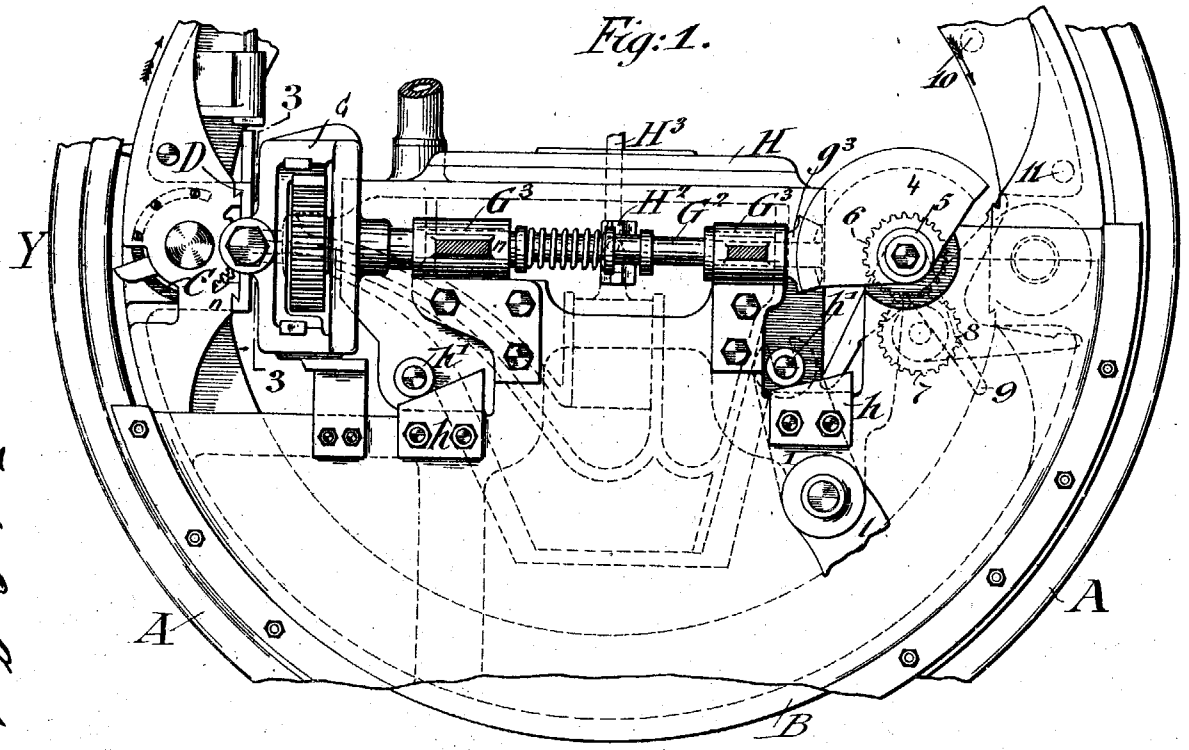
Witnesses:
H. Lee Helms.
Norris Lumby.
Fritz C. Lucke d'Aix.
Inventor
By Attorney
Marilles Bailey
ANDREW. S. GRAHAM CO., PHOTO-LITHOGRAPHERS, WASHINGTON, D. C.

F. C. L. D'AIX.
LINE CASTING MACHINE.
APPLICATION FILED AUG. 20, 1908.
Reissued Dec. 7, 1909.
13,048.
11 SHEETS—SHEET 2.
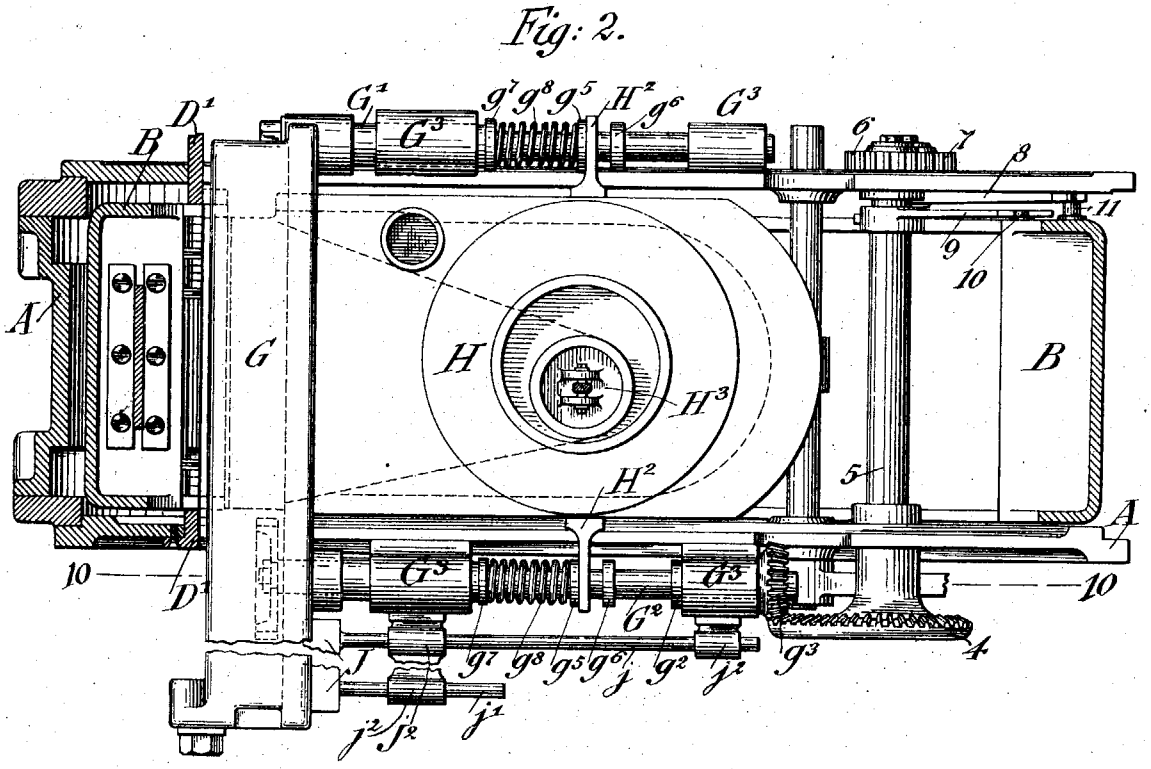
Witnesses:
H. Lee Helms
Norris Lumby.
Fritz C. Lucke d'Aix
Inventor
By Attorney
Manuel Bass F. C. L. D'AIX.
LINE CASTING MACHINE.
APPLICATION FILED AUG. 20, 1908.
Reissued Dec. 7, 1909.
13,048.
11 SHEETS—SHEET 3.
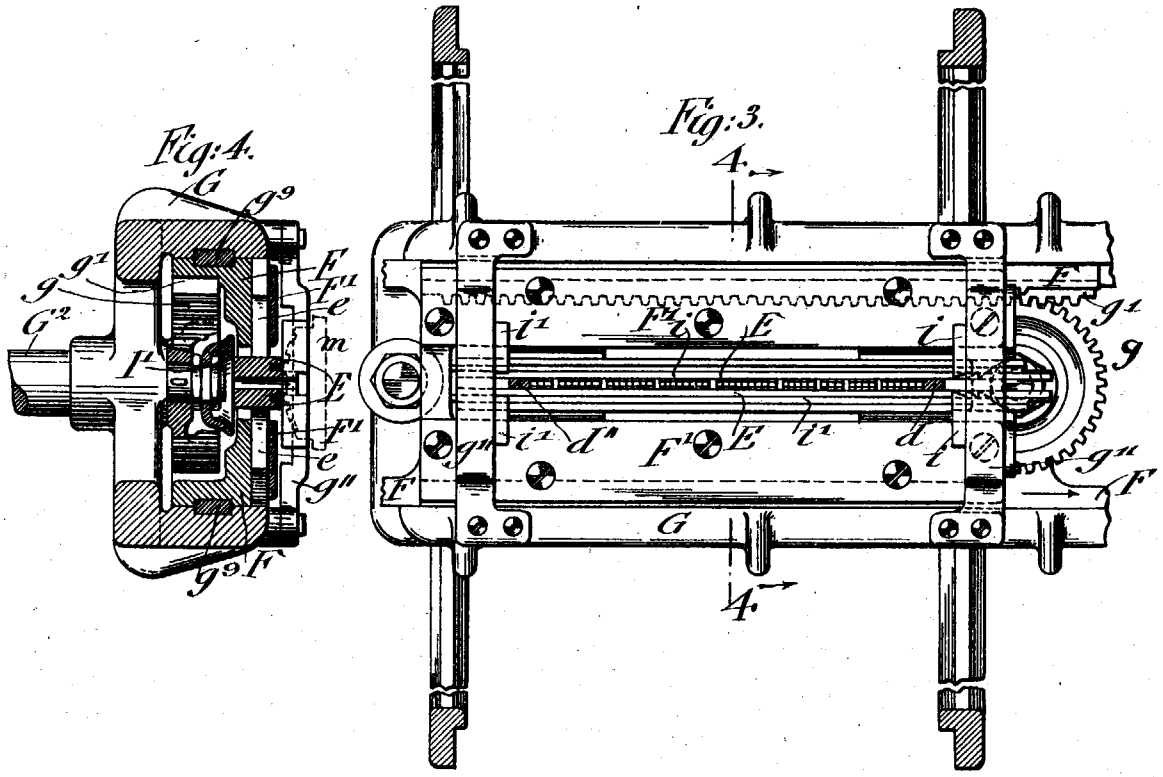
Witnesses:
H. Lee Helm
Norris Sumby
Fritz C. Rucke d'Aix
Inventor
By Attorney
Maullin Barber F. C. L. D'AIX.
LINE CASTING MACHINE.
APPLICATION FILED AUG. 20, 1908.
Reissued Dec. 7, 1909.
13,048.
11 SHEETS—SHEET 4.
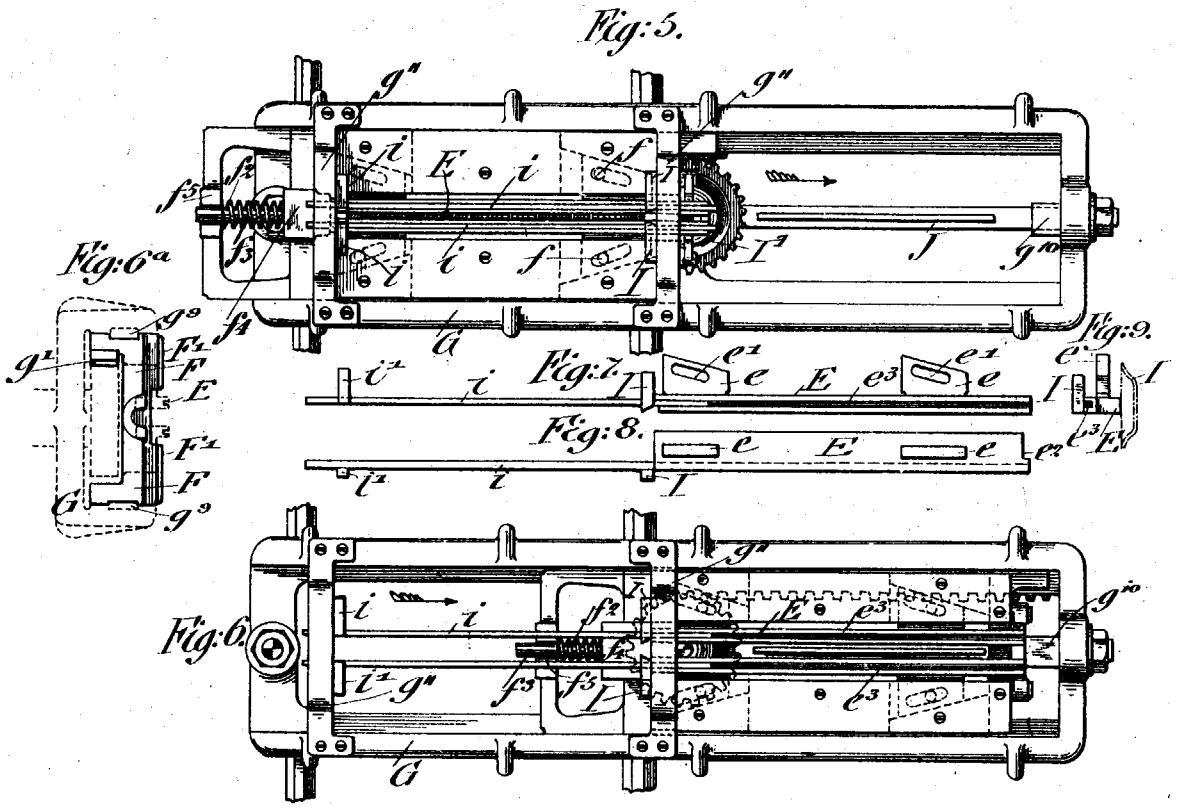
Witnesses:
H. Lee Helms.
Norris Sumby
Fritz C. Lucke d'Aix
Inventor
By Attorney
Marcellus Bailey F. C. L. D'AIX.
LINE CASTING MACHINE.
APPLICATION FILED AUG. 20, 1908.
Reissued Dec. 7, 1909.
13,048.
11 SHEETS—SHEET 5.
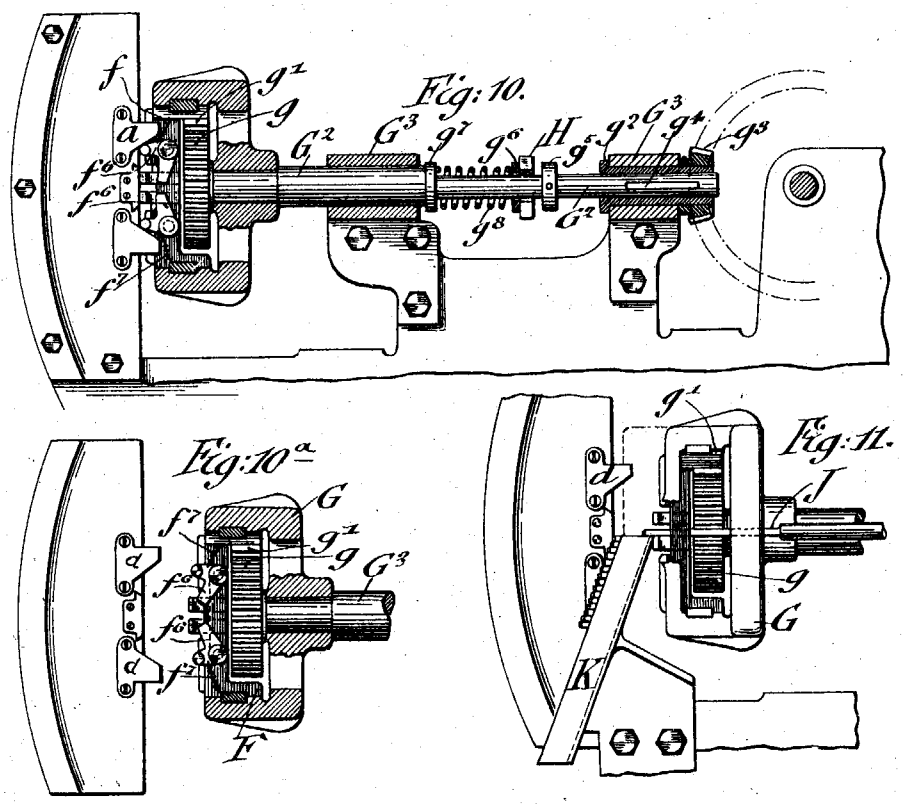
Witnesses:
H. Lee Helms
Norris Sunby
Fritz C. Lucke d'Aix
Inventor
By Attorney Marcellus Bailey
ANDREW B. GRAHAM CO., PHOTO-LITHOGRAPHERS, WASHINGTON, D. C.

F. C. L. D'AIX.
LINE CASTING MACHINE.
APPLICATION FILED AUG. 20, 1908.
Reissued Dec. 7, 1909.
13,048.
11 SHEETS—SHEET 6.
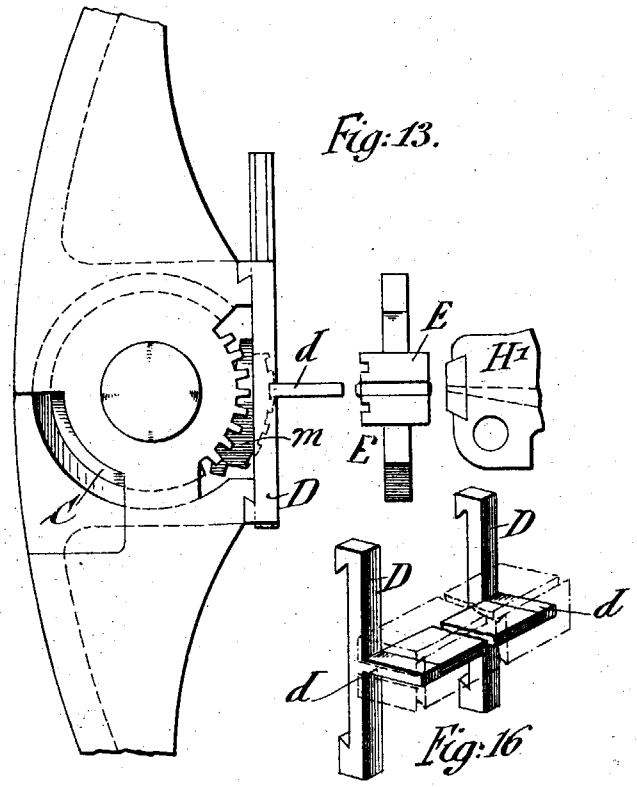
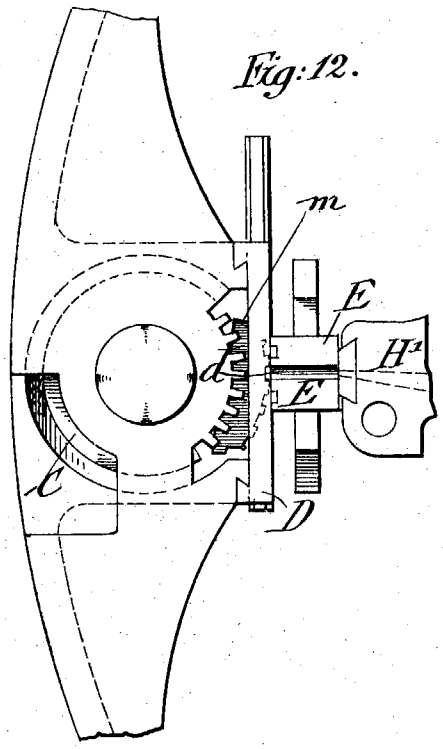
Witnesses:
H. Lee Helms
Norris Sumby
Fritz C. Lucke d'Aix
Inventor
By Attorney
Marcellus Bailey
ANDREW. B. GRAHAM CO., PHOTO-LITHOGRAPHERS, WASHINGTON, D. C.

F. C. L. D'AIX.
LINE CASTING MACHINE.
APPLICATION FILED AUG. 20, 1908.
Reissued Dec. 7, 1909.
13,048.
11 SHEETS—SHEET 7.
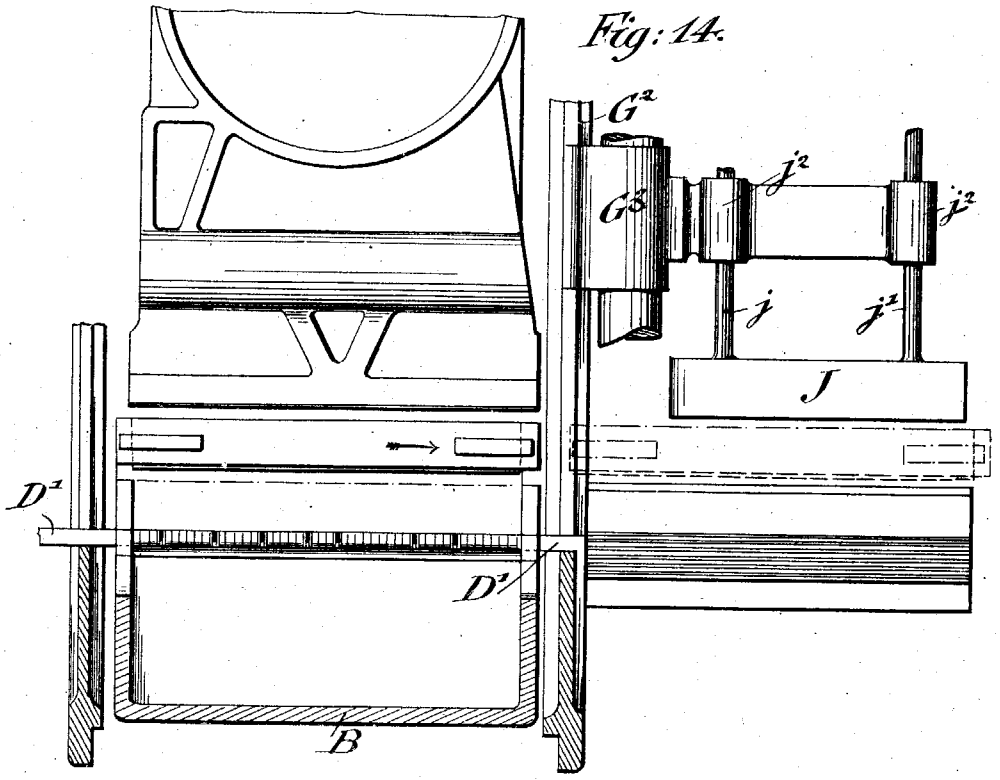
Witnesses:
W. Lee Helms
Norris Lumby
Fritz C. Lucke d'Aix
Inventor
By Attorney
Marcellus Bailey

F. C. L. D'AIX.

LINE CASTING MACHINE.

APPLICATION FILED AUG. 20, 1908.

Reissued Dec. 7, 1909.

13,048.

11 SHEETS—SHEET 8.

Witnesses:
H. Lee Helms
Morris Sundy

Fritz C. Lucke d'Aix
Inventor

By Attorney
Marcellus Bailey

F. C. L. D'AIX.
LINE CASTING MACHINE.
APPLICATION FILED AUG. 20, 1908.
Reissued Dec. 7, 1909.
13,048.
11 SHEETS—SHEET 9.
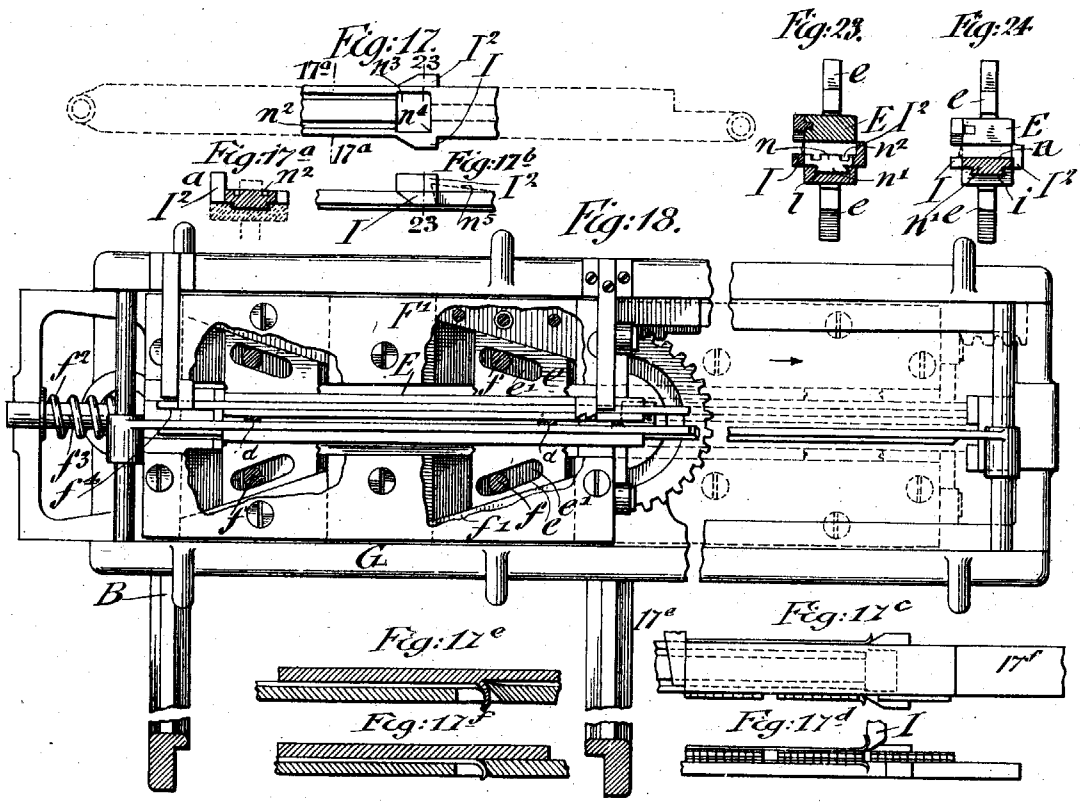
Witnesses:
H. Lee Helms
Norris Sumby
Fritz C. Lucke d'Aix
Inventor
By Attorney
Macallus Bailey
ANDREW B. GRAHAM CO., PHOTO-LITHOGRAPHERS, WASHINGTON, D. C.

F. C. L. D'AIX.
LINE CASTING MACHINE.
APPLICATION FILED AUG. 20, 1908.
Reissued Dec. 7, 1909.
13,048.
11 SHEETS—SHEET 10.
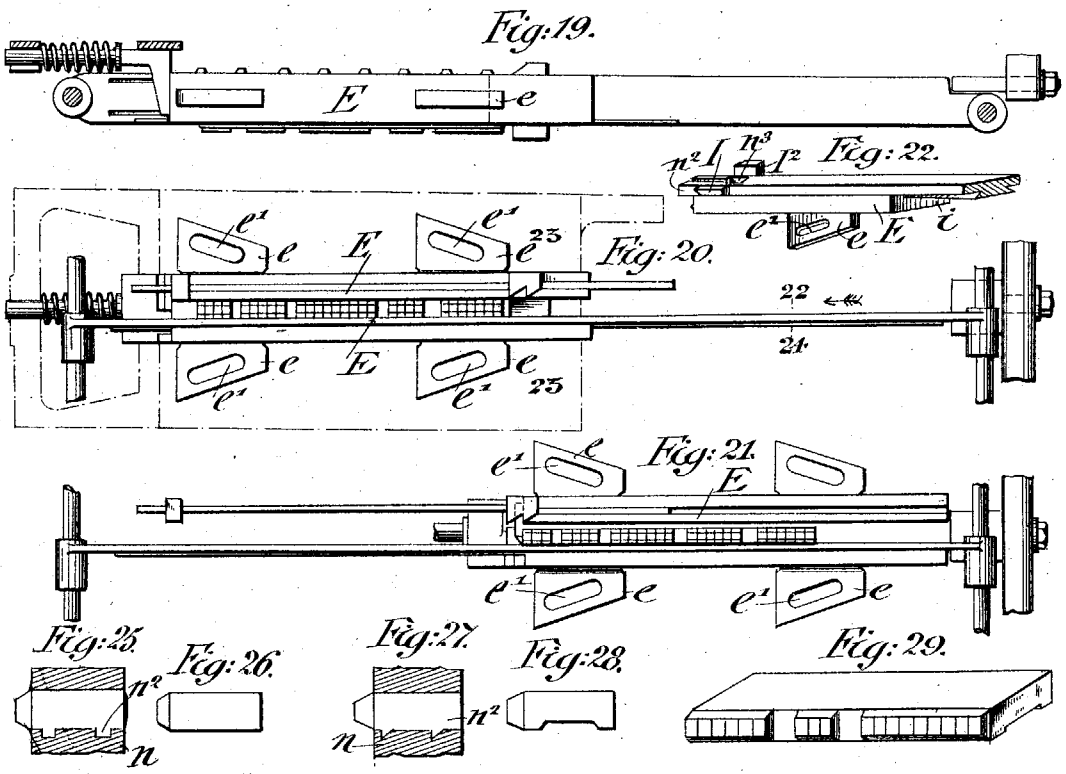
Witnesses:
H. Lee Helms
Norris Lumby
Fritz C. Lucke d'Aix
Inventor
By Attorney
Marullo & Bailey
ANDREW B. GRAHAM CO., PHOTO-LITHOGRAPHERS, WASHINGTON, D. C.

F. C. L. D'AIX.
LINE CASTING MACHINE.
APPLICATION FILED AUG. 20, 1908.
Reissued Dec. 7, 1909.
13,048.
11 SHEETS—SHEET 11.
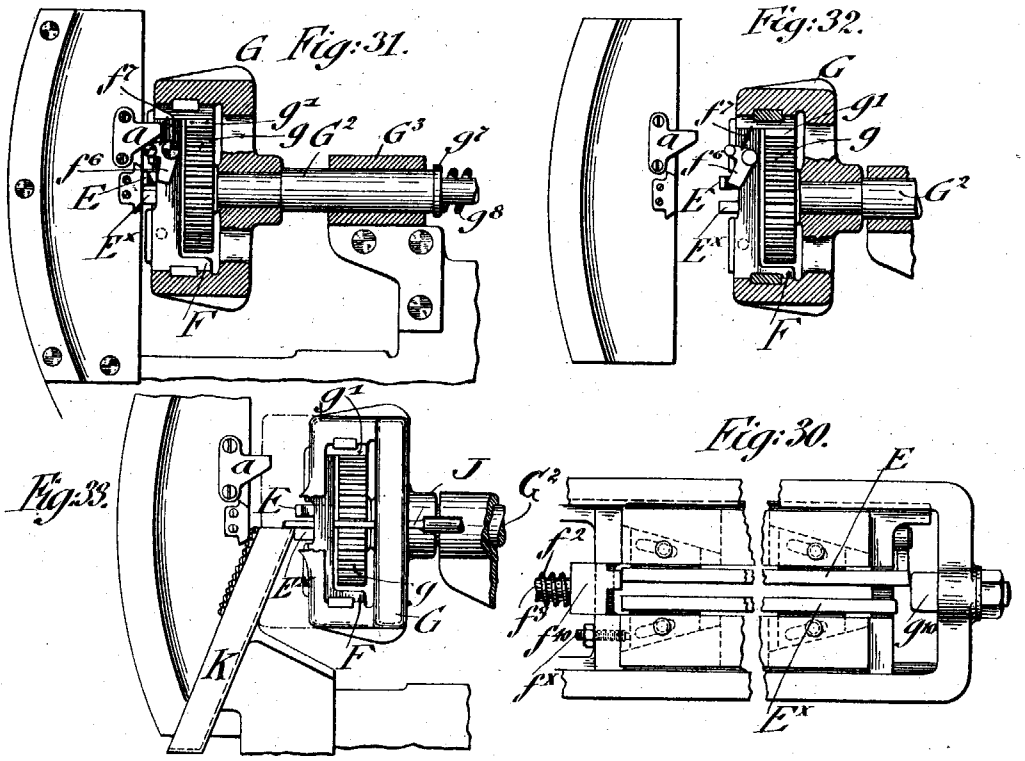
Witnesses:
H. Lee Helms
Norris Sumby
Fretz C. Locke d'Aix
Inventor
By Attorney
Marcellus Bailey

UNITED STATES PATENT OFFICE.

FRITZ C. LUCKE D'AIX, OF NEW YORK, N. Y., ASSIGNOR, BY MESNE ASSIGNMENTS, TO EMPIRE TRUST COMPANY, TRUSTEE, OF NEW YORK, N. Y., A CORPORATION OF NEW YORK.

LINE-CASTING MACHINE.

13,048. Specification of Reissued Letters Patent. Reissued Dec. 7, 1909.

Original No. 834,971, dated November 6, 1906, Serial No. 295,618. Application for reissue filed August 20, 1908. Serial No. 449,571.

*To all whom it may concern:*

Be it known that I, FRITZ C. LUCKE D'AIX, of New York city, county and State of New York, have invented certain new and useful Improvements in Line-Casting Machines, of which the following is a specification.

These improvements in line-casting machines have to do with casting and finishing slugs or lines of type, the object being to provide means for this purpose which will permit lines of type of different thickness and lengths to be cast and finished without necessitating the removal or displacement by others of any of the parts of the mechanism, and to this end will automatically adjust themselves to the varying conditions of the work.

The improvements relate to the structure of the mold itself, to the means of shifting it from casting to ejecting position and thence back into casting position again, and to means whereby the slug or cast line on its way from the mold is trimmed and finished. They can best be explained and understood from reference to the accompanying drawings, in which—

Figure 1 is a side elevation on so much of a line casting machine as needed to illustrate my improvements. In this figure the slug-ejecting mechanism and the receiver for the ejected slug are omitted in order not to obscure other and more material portions of the machine. Fig. 2 is a plan of the same, the main frame and revoluble annular frame in which the matrix-carrying cylinder is mounted being in horizontal section. Fig. 3 is a front elevation of the mold, comprising the mold-jaws, the slide in which they are mounted, and the carrier in which the slide is mounted looking in the direction of the arrow on line 3 3, Fig. 1, the ends of the slide and the right hand end of the carrier being broken away. The parts in this figure are in casting position, and the jaw contains a cast line. Fig. 4 is a cross section of the same on line 4 4, Fig. 3, looking in the direction of the arrow. Fig. 5 is a front elevation, on slightly reduced scale, of the complete mold in casting position. Fig. 6 is a like view of the same in ejecting position. Fig. $6^a$ is an end elevation (left-hand end) of the slide in which the mold-jaws are mounted, the carrier and the mold-jaws being represented in dotted lines. Fig. 7 is a front elevation, Fig. 8 is a plan, and Fig. 9 is an end elevation, of one of the jaws, together with the shaving-knife and the carrier pertaining thereto for trimming the front of the slug. In Fig. 9 is shown in dotted lines the rotary knife for trimming the rear end of the slug. Fig. 10 is a section on line 10 10, Fig. 2, showing the mold-carrier in casting position. Fig. $10^a$ is a like view with the mold-carrier withdrawn from casting position. Fig. 11 is a side elevation of the mechanism illustrated in Fig. $10^a$, but with the parts in ejecting position, showing also the slug ejector and receiver. Fig. 12 is an enlarged side elevation of the parts which bound the mold space—viz., the mold jaws, which form the top and bottom, the setting-pieces, which form the sides, the line of matrices, which close the front, and the nose of the melting pot, which closes the rear of the mold, these parts being in casting position. Fig. 13 represents the same parts when the mold-jaws and the melting-pot are withdrawn from casting position. Fig. 14 is a plan of the parts shown in Figs. 12 and 13, together with a portion of the ejecting mechanism. They are represented in full lines in the position they occupy in Fig. 13 and in dotted lines both in the position they occupy in Fig. 12 and also in the position they occupy when shifted to ejecting position. Fig. 15 is a side elevation, on reduced scale, of a complete line casting machine embracing the improvements. Fig. 16 is a perspective view of the "setting-pieces" shown in Figs. 12 and 13, together with the cast slug held between them, the mold-jaws and nose of the melting pot being represented in dotted lines. Fig. 17 is a plan of a modified form of slug-trimming device. Fig. $17^a$ is a cross-section on lines $17^a$ $17^a$, Fig. 17. Fig. $17^b$ is a front elevation of the device shown in Fig. 17. Figs. $17^c$, $17^d$, $17^e$, $17^f$ show the cast slug in various shaving positions. Fig. $17^c$ is a plan and Fig. $17^d$ is a front elevation, of the shaving devices and the slug operated on. Figs. $17^e$ and $17^f$ are sections on line $17^e$ $17^f$ of Fig. $17^c$, the only difference between the two being in the arrangement of the blade for shaving the under face of the slug. Fig. 18 is a front elevation of the mold provided with the modified trimming device illustrated in the last preceding figures beginning with Fig. 17. This figure also has the front of the carrier broken away to show more clearly the arrangement of parts by which the parallel opening and closing movement of the mold-jaws is assured, this arrangement being common to the mold represented in all of the figures. Fig. 19 is a plan of the jaws and this modified form of shaving device. Fig. 20 is a front elevation in casting position of the parts represented in Fig. 19. Fig. 21 is a like elevation of the same parts in ejecting position. Fig. 22 is a sectional perspective view on line 22 24, Fig. 20, omitting the upper mold-jaw. Fig. 23 is a section on line 23 23, Figs. 17 and 20, looking in the direction of the arrow. Fig. 24 is a cross-section on lines 22 24, Fig. 20. Fig. 25 shows an untrimmed slug between the mold-jaws. Fig. 26 shows the same slug trimmed. Figs. 27 and 28 show a modified form of slug trimmed and untrimmed. Fig. 29 is a perspective view of a trimmed cast slug, such as shown in side elevation in Fig. 28. Figs. 30, 31, 32, 33 represent a modification in which one only of the mold-jaws is movable to and from the other, the other jaw being stationary. Fig. 30 is a front elevation of the parts of the mold in ejecting position corresponding to the right hand portion of Fig. 6. Fig. 31 is a sectional view with the mold-carrier in casting position corresponding to Fig. 10. Fig. 32 is a like view with the mold-carrier withdrawn from casting position corresponding to Fig. 10[a]. Fig. 33 is a side elevation of the mechanism illustrated in Fig. 32, but with the parts in ejecting position, showing also the slug ejector and receiver corresponding to Fig. 11.

The invention has been designed more particularly with reference to the needs of that kind of line-casting machine (set forth, for example, in Letters Patent No. 697,859) in which the matrices are single-character matrices provided each with a plurality of character-spaces having letters or signs which are the same in all the character-spaces, but differing between themselves in style &c., and are combined with a carrier for the composed line of matrices and means for shifting the carrier in order to bring the desired line of type-faces on such matrices into casting position in front of the casting-mold, and it is in this connection that I have illustrated it in the accompanying drawings, without, however, limiting myself thereto.

Referring now more particularly to the general views Figs. 1, 2, and 15, A is the main frame, in the cylindrical portion of which is mounted a revoluble annular frame B, carrying one or more matrix-carrying cylinders C suitably mounted in frame B so as to be capable of revolution. Two of such cylinders would be used in practice, one mounted diametrically opposite the other in the annular frame B. One of these cylinders, longitudinally ribbed to carry a line of correspondingly-notched segmental matrices *m*, is shown in Figs. 12 and 13. It may be said here by way of explanation that the annular frame B revolves with the sun or in the direction of the arrows, Fig. 1, having an intermittent movement of rotation from some suitable source of power, through gearing, typified by the shafts B′ B′, Fig. 15. It passes successively (referring to Fig. 15) to the point X, at which the matrices are received from the assembling-alley and entered on the carrier-cylinder C to Y, (where the carrier-cylinder C is represented as being) in the casting position of the carrier, and to Z, where the matrices are ejected from the cylinder C into the distributing-alley.

The construction, arrangement, and mode of operation of the rotatable matrix-carrying cylinder C and the devices with which it is more immediately associated are fully set forth in my Patent No. 807,566 of December 19, 1905, and do not require explanation here further than to say that said cylinder, adapted to receive a line of matrices having a plurality of type-faces, is mounted in a revoluble frame B, by which it is conveyed to the assembling, casting, and distributing points successively, and is associated with means by which it may be shifted at will at or before the time it reaches the casting point to bring any desired line of type-faces in position for casting and may then be locked in such position.

The line of matrices on the matrix-carrying cylinder C is included between setting-pieces D, (shown in perspective in Fig. 16,) one at each end of the line, as seen in Fig. 14, which represents in top view a line of matrices *m*, with setting pieces D at the beginning and at the end of the line. These setting pieces are placed in their proper positions at the time of assembling the matrices and entering them on the matrix-cylinder at X, Fig. 15, and they are mounted and held on the frame B, which carries the matrix-cylinder, in any suitable way, in the present instance by being suitably formed to engage a dovetail way on the front of the frame, as indicated in Figs. 1, 12, 13 and 16.

The setting-pieces D are provided each with a horizontal tongue *d*, what projects to the front in position to enter between the mold-jaws when the carrier in which the jaws are mounted is moved toward the line of matrices. These tongues which are closed upon by the mold jaws, as will be presently described, constitute the side walls of the mold and determine the thickness of the line to be cast. To this end a number of setting-pieces with tongues of different thicknesses are provided, so that in assembling a line of matrices there may be assembled therewith setting-pieces having tongues of the thickness required for the particular line of type faces to be cast. In order that these setting-pieces D shall remain fixed in their positions and without spreading apart during the spacing of the line of matrices, (which takes place at the casting-point, as described in my aforesaid patent, No. 807,566,) two retaining or locking pieces are provided (indicated at D′, Figs. 2 and 14). These parts D′ find suitable bearings in side pieces A′ attached to main frame A. One of them (the lower one in Fig. 2) is fixed to its plate A′. The other (the upper one in Fig. 2) is adjustable on its plate A′ and can be set and controlled by a suitable index-plate and crank-handle $D^2$, Fig. 15, and intermediate connections between the handle and the locking-piece, which form no part of the present application, and therefore are not here illustrated.

I proceed now to describe the mold-jaws which form the top and bottom of the mold-space and the parts in which they are mounted and by which they are supported and carried. The jaws (designated E) are horizontal parallel plates capable of parallel movement to and from one another, like the limbs of a parallel-ruler, and are spring closed. They are mounted in a slide F, which in turn is mounted in and capable of sliding movement lengthwise of a carrier-frame G, which is arranged opposite to the position occupied by the line of matrices at the casting-point Y and is capable of movement toward or away from the line of matrices.

The spring-closing mold-jaws E are made capable of parallel movement to and from one another in order that they may adapt themselves to the different thicknesses of the setting-piece tongues *d*, upon which they close.

The carrier G is made movable to and from the line of matrices in order that after the line has been cast it (the carrier) together with the slide and jaws carried by it, may be retracted far enough to withdraw the tongues *d* from between the jaws, thus allowing the latter to close firmly upon the cast slug and may then be again returned at the proper time to casting position.

The slide F is made movable lengthwise of the carrier G in order that when the latter has been withdrawn far enough to disengage the jaws from the tongues *d* the slide may then convey the jaws with the slug held by them from the casting to the ejecting position and after the ejection of the slug may return the jaws to casting position before the carrier G again advances toward the line of matrices. The jaws on reaching ejecting position are of course opened automatically to release the slug and are locked in this position during their return to casting position and until the carrier G has again advanced so as to enter the tongues *d* between the jaws, at which time the jaws are automatically unlocked to allow them to close upon the tongues.

The cast slug is automatically trimmed during the movement of the slide F from casting to ejecting position by suitable knives or cutters which are attached to the carrier G so as to occupy a stationary position relatively to the slide.

I proceed now to a description of the mechanism by which the carrier G is moved toward and away from the line of matrices. The mold carrier G is supported and carried by two horizontal shafts G′ and $G^2$, Figs. 1 and 2. The shaft G′ at the casting end of the frame G is nonrotatable, being fixed immovably to the frame, and is supported and capable of sliding lengthwise in suitable bearing-sleeves $G^3$, attached to the side plates of the main frame A. The other shaft $G^2$, supported in like bearing-sleeves $G^3$, is, however, not only capable of sliding lengthwise, but is also rotatable, and its front end has a bearing in the mold-carrier G, in which it can rotate, as seen more clearly in Figs. 10 and $10^a$, the purpose of this being to provide for moving the slide F by means of a pinion *g* on the end of the shaft, which engages a rack *g′* on slide F, as will be hereinafter more fully described.

It may be here remarked that to permit the sliding movement of shaft $G^2$ without interfering with its rotation its rear end, as seen in Fig. 10, passes through and takes its bearing in a sleeve $g^2$, supported against end-wise movement in the rear bearing $G^3$, in which it can rotate. On the rear end of sleeve $g^2$ is fixed the beveled pinion $g^3$, by which the sleeve is rotated, and there is a longitudinal groove and spline-joint between the sleeve $g^2$, and the shaft $G^2$ (the groove being shown in the shaft at $g^4$, Fig. 10) which will permit the shaft to slide lengthwise in, while partaking of the rotary movement of the sleeve $g^2$.

By the lengthwise sliding movement of the shafts G′ $G^2$ the mold-carrier G can be advanced toward or retracted from the line of matrices as desired. The shafts serve to guide and assure the correct movement of the mold-carrier. The intermediary through which this movement is imparted is in this instance the melting-pot H, which is supported on forwardly and downwardly inclined bearings *h* by rollers *h′*, laterally projecting from it and mounted on suitable cross-shafts or cylindrical rods supported in bearings attached to the pot. When the melting-pot is advanced, the nose H′ of its spout bears against the rear edges of the jaws E (registering with the mold-space included between the jaws above and below and the two tongues $d$ at the sides) and moves with the carrier G forward until the front edges of the jaws bring up against the line of matrices. To this end the melting-pot is provided with laterally-projecting forked lugs $H^2$ (shown in Figs. 1, 2 and 10) which straddle the shafts $G'$ $G^2$ respectively, extending between two collars $g^5$ $g^6$ on each shaft. The front collar $g^5$ is loose on the shaft. The rear collar $g^6$ is fixed thereon. Between the front collar $g^5$ and a shoulder $g^7$ on each shaft to the front of collar $g'$ is confined a spiral spring $g^8$.

When the melting-pot moves forward, the forked lugs $H^2$ bearing against the loose collars $g^5$ push the carrier G forward until the mold-jaws meet the line of matrices. The melting-pot, however, moves still farther forward, with the result of compressing the springs $g^8$, the result being that the carrier G is held with spring-pressure against the line of matrices, while at the same time the nose of the spout of the melting-pot is allowed to seat itself tightly at the back of the mold-space, which is thus sealed at front and rear, as well as above and below and at the sides. The parts in this position are shown in Fig. 12. When the melting pot is retracted, a reverse movement takes place. During the first portion of rearward movement of the lugs $H^2$ and until they bring up against the fixed collars $g^6$ on the shafts $G'$ $G^2$ the spring-pressure of the mold-carrier on the line of matrices is relieved and the nose of the melting-pot is withdrawn from the mold-carrier, and the farther rearward movement of the lugs $H^2$ will, through the fixed collars $g^6$, against which the lugs bear, retract the mold-carrier also from the line of matrices, the parts finally assuming the position illustrated in Fig. 13, when the mold-jaws have been retracted far enough to withdraw them from the tongues $d$ of the setting pieces. The melting-pot may thus be actuated to move at the proper times by any suitable instrumentality, consisting in this instance, as seen in Figs. 1 and 15, of a lever 1 pivoted to the main frame, having a forked upper end to straddle the rear roller-shaft of the melting pot and having a roller-armed lower end which bears against the acting face of a suitably-shaped operating-cam 2 on power-driven shaft 3. The lever serves to retract. The weight of the pot will cause it to move forward upon its downwardly and forwardly inclined bearings whenever it is free to do so.

The mold-carrier G remains in the retracted position, (shown in Figs. $10^a$, 11, 13,) while the jaw-carrying slide F moves in said carrier from casting to ejecting position and back again to casting position, the carrier-frame G being long enough to accommodate this movement of the slide.

The slide F is shown clearly in Figs. 4, 5, 6, $6^a$ and 18. It is a skeleton frame with a longitudinal opening through it wide enough to accommodate the jaws and to permit them to open. It is of suitable shape to fit between the upper and lower faces of the carrier-frame G and is guided in its longitudinal movements therein by feathers $g^9$ in the carrier-frame G, which engage corresponding grooves in the top and bottom faces of the slide. As beforesaid, the longitudinal traveling movement of the slide is obtained from the pinion $g$ on the rotatable shaft $G^2$, which engages a rack $g'$ on the slide.

The rotation of shaft $G^2$ is obtained as follows, reference being had more particularly to Figs. 1 and 2 and 15, although in the last named figure the operating-levers are omitted. The beveled pinion $g^3$ of shaft $G^2$ gears with a beveled toothed sector 4, mounted on one end of a shaft 5, having its bearings in the sides of main frame A, through which it extends crosswise, said shaft having on its opposite end a pinion 6, which meshes with a like pinion 7, having its bearings in the side of the frame A, on which pinion 6 is located. Fast upon the hub of pinion 7 is an operating-lever 8, and fast upon the shaft 5 is an operating lever 9, both of these levers being upon the inner face of the side of the main frame A, as seen in Fig. 2, in the path of their respective operating studs 10 11, which laterally project from the adjoining face of the intermittently-rotating annular frame B. For the purpose of securing the proper range of movement each operating-lever 8 and 9 is a double lever, its two arms being successively brought into the path of a plurality of properly-positioned studs 10 or 11. Studs 10 operate on the double lever 9 (which in Fig. 1 is shown in position to be operated upon) with the effect of rotating shaft $G^2$ in a direction to move the slide F from casting to ejecting position. Studs 11 operate on the double lever 8 (which by the preceding movement of its pinion 7 will be brought into operative position with respect to its studs 11) with the effect of rotating the shaft $G^2$ in the reverse direction, and thus returning the slide to casting position in frame G and the lever 9 to operative position.

The jaws E E and the operating devices more immediately associated with them are illustrated clearly in Figs. 3, 4, 5, 6, 7, 8, 10, $10^a$, and 18.

Each jaw—so far as concerns the structure represented in Figs. 1 to 15, inclusive, and disregarding minor variations due to modifications in the shape and arrangement of the slug-trimming devices—is a plate of the form shown, for example, at E, Figs. 7 and 8, in each of which figures the device on the left is the slug trimming or shaving appliance, which, for the present, need not be noticed. The jaws, as shown in the various figures, have each two upright wings $e$, which are held between the back wall of the slide F and front plates F′ on said slide, as more clearly shown in Fig. 4. These wings are each provided with an inclined slot $e'$, which engages a pin $f$ on the back wall of the slide, and with a correspondingly-inclined outer longitudinal edge against which is fitted the similarly-inclined longitudinal edge of a piece $f'$ attached to the back wall of the slide F. The slots in the wings of the jaws incline downward through the ejecting end of the frame G, and the jaws are pressed in a direction to cause them to close by a spiral spring $f^2$, which encircles a rod $f^3$, that projects from a presser-block $f^4$, suitably mounted and guided in slide F, the outer end of the rod having its bearing at $f^5$ in the contiguous end of the slide and the spring $f^2$ being confined between the presser-block and that adjoining end of the slide.

The mold-jaws E are opened against the stress of spring $f^2$ by having their other ends as they are nearing ejecting position—or, in other words, traveling from the position shown in Fig. 5 to that shown in Fig. 6—strike against an abutment $g^{10}$ at the ejecting end of the carrier-frame G, which, as the slide G still moves along in that direction, will have the effect of forcing back the jaws and opening them as indicated in Fig. 8. The jaws are held in this open position against the stress of the spring $f^2$ by elbow-lever detents $f^6$ on the end of the slide F nearest the ejecting end of frame G, which detents are pivoted at their elbows to the slide, as indicated in Figs. 10, 10ª, and are spring-pulled (by springs $f^7$) in a direction to cause them to enter notches $e^2$, Fig. 8, in the ends of the jaws when the jaws are pushed back far enough to bring these notches opposite the detents. The jaws are held thus open by the detents during the return movement of the slide from ejecting to casting position and until the mold-carrier G has again moved forward from the position shown in Fig. 10ª to the position shown in Fig. 10, at which time the detents will be operated by stationary cams or inclines $a$ on suitable part of the main frame A to release the jaws, which will at once close together as far as permitted by the tongues $d$ of the setting-pieces, which by the forward movement of the mold-carrier G have been entered between the mold-jaws.

While I prefer that both of the jaws should be movable to and from each other, yet this movement may be confined to but one of the jaws, and I desire to be understood as including this modification in my claims, what is essential in this respect being that the jaws which form the top and bottom of the mold should be movable one to and from the other (whether one or both be thus movable) in such manner as to effect the opening and closing of the mold. The modification referred to is illustrated in Figs. 30 to 33, wherein the jaw closing and opening mechanism is applied to but one jaw—in this instance the upper jaw—while the other (lower) jaw is motionless in the slide, the arrangement being such that the stop $g^{10}$ meets and acts on the upper jaw only.

Figs. 30, 31, 32, 33 correspond to Figs. 6, 10, 10ª, and 11, respectively, with such differences merely as grow out of the fact that the upper jaw E only is movable, and like letters of reference in the two sets of figures indicate corresponding parts.

The presser-block $f^{10}$, Fig. 30, (corresponding to presser-block $f^4$, Fig. 6) is notched or cut away, so as to bear against the left-hand end of the upper jaw only, which is thus spring-closed.

There is but one detent $f^6$ and stationary incline $a$ in these figures, these being designed to coöperate with the upper jaw.

The lower jaw $E^x$ is similar to the jaw E in Fig. 6, save that it is shorter, so as not to reach the stop $g^{10}$, and has no notch $e^2$ in its end.

In the slide F is a set-screw $f^x$, which bears against the vertical edge of the left-hand wing $e$ of this jaw. The tendency of the jaw is to drop by movement to the left as far as permitted by the inclined slots $e'$ and the screw-pins $f$. The set-screw $f^x$ when turned in one direction pushes the jaw $E^x$ to the right, at the same time raising it, and when turned in the other direction permits the jaw to drop back to the left. In this way the jaw can be accurately adjusted to the desired position, and can then be held in that position by suitable means—as, for example, by screwing down the pins $f$ until their heads clamp the wings $e$.

The mode of operation of the parts illustrated in these figures is substantially the same as that already described in connection with Figs. 6, 10, 10ª, and 11, the only difference being that the opening and closing of the mold is effected by the movement of one mold-jaw instead of both.

The means for trimming the cast slug will now be described, confining attention for the present to the devices shown in Figs. 3, 4, 5, 6, 7, 8, 9, these devices being designed to trim the front and rear ends of the slug.

For trimming the fins at the front or type-face end of the slug S there are two knives I, one carried by each mold-jaw.

Each knife I, as seen in Figs. 7 and 8, is fixed to one end of a straight feather-bar $i$, which at or near its opposite end has a guide-block $i'$, similar to the knife I in general shape, but without a cutting edge. The knife-block I and the guide-block $i'$ are confined between two parallel vertical guide-bars $g^{11}$, attached to the front of the mold-carrier G, as seen in Figs. 3, 4, 5 and 6, with the interior opposite vertical edges of which guide-bars the exterior opposite edges of the two blocks I and $i'$ are in contact. The feather-bar $i$ of each knife I fits loosely in a longitudinal groove $e^3$, formed for its reception in the front edge of its mold-jaw E. Under this arrangement it will be seen that the knives can move up and down, but are held from lengthwise movement, in the carrier-frame G. Consequently they move apart or together with the jaws to which they pertain, thus automatically adapting themselves to the thickness of the cast line or slug; but they remain motionless when the slide F and the jaws E move lengthwise in the frame G, with the result of trimming the fins on the type-face end of the slug when the slide F moves from casting to ejecting position.

The knife for trimming the rear end of the slug during the last-referred-to movement of the slide F is a rotary knife I′, Figs. 4, 5, 9, which is mounted on the front end of and revolves with the shaft $G^2$.

The ejector by which the cast slug is pushed forward out from between the opened mold-jaws is shown at J, Figs. 2, 5, 6, 11, 14. It is carried by horizontal rods $j$ and $j'$, supported and adapted to slide back and forth in bearing-sleeves $j^2$, attached to the bearings $G^3$ of shaft $G^2$. The ejector may be spring-retracted (the retracting-spring is not shown,) and, as indicated in Fig. 15, it is at the proper time advanced to eject the slug by a stud 12 on the intermittently rotating annular frame B, which operates on one end of a lever 13, pivoted to the side of the main frame A, the other end of which lever bears against the rear end of one of the supporting-rods $j$ of the ejector. The receptacle into which the slug is discharged is indicated at K, Fig. 11.

The melting-pot H is provided with the usual plunger $H^3$ for ejecting the molten metal from the pot, said plunger being operated at the proper time by a lever 14, Fig. 15, pivoted to the main frame, with its upper end connected to the plunger and its lower end extending down to meet its operating-cam 15, (shown in dotted lines,) mounted on and revolving with shaft 3.

The operation of the parts thus far described is as follows: A line of matrices having been assembled and provided with proper setting-pieces D is, at the point designated X, Fig. 15, entered into the matrix-cylinder C, assuming that the annular revoluble frame B, in which said cylinder is mounted, has been temporarily halted in a position to bring the matrix-cylinder opposite that point. The annular frame B is then rotated until the line of matrices arrives at the position Y, where motion of the frame B is temporarily arrested. During this pause the casting of the slug is effected, the mold-frame G, mold-jaws E and melting-pot being in the position represented in Fig. $10^a$ at the time the line of matrices arrives at Y and the mold-jaws being open and locked in that position. The melting-pot by its actuating mechanism is moved forward, meeting the mold-frame G and carrying it forward also until at the conclusion of the forward movement the mold-jaws E rest tightly against the line of matrices, the nose of the melting-pot is pressed tightly against the rear side of the mold-jaws, the tongues $d$ of the "setting-pieces" have entered between the jaws, and then, just at the conclusion of the forward movement, the jaws by the action of the stationary inclines $a$ on frame A have been released from control of their detents $f^6$ and allowed to close tightly upon the tongues $d$, in this way providing a hollow air-tight mold-space bounded by these parts and ready to receive a charge of molten metal for the production of a cast line or slug of predetermined length, breadth, and thickness, as indicated in Figs. 10, 12. At this moment the plunger $H^3$ of the melting-pot will be actuated to force from the melting-pot into said mold-space the required charge of molten metal, thus casting the slug. The pot, mold, and casting mechanism will now recede from the line of matrices to return to the position indicated in Figs. $10^a$ and 13, as follows: The pot by its actuating mechanism will be retracted, thereby first drawing the mouth of the pot away from the rear of the jaws E and the cast slug therein, and then when the lugs $H^2$ on the pot meet the fixed collars $g^6$ on shafts G′ $G^2$ the jaws and the mold-carrier G will also be retracted with the pot until the parts reassume the position indicated in Fig. 13, by which time the mold-jaws will have withdrawn from the tongues $d$ of the setting-pieces D and will have closed tightly upon the cast slug, thus holding the same in a firm grip. This having been done, annular frame B resumes the travel and carries the matrix-cylinder and the line of matrices thereon to position Z, Fig. 15, which is the point where the line of matrices is discharged from the matrix-cylinder C to the distributer, at which time another matrix-cylinder, diametrically opposite the cylinder C, will be at the position X, ready to receive a new line of matrices from the composing-galley of the machine, which goes through the same course of movement as that already described for the cylinder C. During the partial rotation (through ninety degrees) of the annular frame B from Y to Z the slide F by its actuating mechanism has been caused to carry the jaws E from casting to ejecting position, in so doing which the slug is trimmed at each end by the shaving devices, the jaws are opened to release the trimmed slug, and then, just before the cylinder C reaches Z position, the ejector is operated to expel the trimmed and finished slug from between the open jaws into the receiver K. The annular frame B again starts on its travel, and during the next quarter of a circle the reversing-movement mechanism of the slide F will be brought into action, with the result of returning the slide and jaws to their casting position in the mold-carrier G, thus completing the cycle of movement for one revolution of the annular frame B.

In Figs. 17–29, inclusive, are represented some modifications of the slug trimming or shaving devices, designed more particularly to provide a convenient means for shaving one or both faces of the slug, if this should be desired. In the present instance but one face (the lower face) of the slug is to be shaved, and for this reason only the lower mold-jaw is provided with a modified form of trimming device, the upper jaw having substantially the same trimming device associated with it as described in connection with the preceding figures. I provide also for providing the cast slug with means by which it will be firmly held and retained in position between the jaws when the latter are retracted from the line of matrices, and I also provide a trimming or shaving device by which said means can subsequently be removed from the slug.

The upper jaw E, as indicated in Fig. 18, has substantially the same feather-bar 2, fitted in a groove in the front edge of the jaw, and the knife I and block $i'$, fitted and adapted to move up and down between guide-bars $g^{11}$ on the carrier-frame G as in Figs. 3, 5, and 6. With the lower jaw, however, the case is different. That jaw, as indicated more particularly in Figs. 20–24, has in its upper face a longitudinal dovetail undercut groove $l$, which is slidably engaged by a tenon $n'$ of similar form on the under face of a plate $n$, which is the full width of the jaw and extends the whole length of the carrier G, being mounted at its sleeved ends on vertical guide-rods $g^{12}$, attached to the frame G, on which rods it can move freely up and down to conform to the opening and closing movement of the lower jaw E, with which it is connected. Thus the jaw can slide freely on the plate $n$, while the latter, although having no lengthwise movement, can move freely up and down with the jaw. On the front edge of this plate $n$ is a trimming-knife I′, and as a substitute for the rotary knife I′ of Fig. 4 there may be attached to the rear edge of said plate a stationary knife $I^2$, Figs. 17, $17^a$, $17^b$, 22, 23, 24, of a size and shape and so located as to trim the rear end of the cast slug as the latter is moved from casting to ejecting position.

In that portion of the face of plate $n$ which is opposite the casting-point are formed two parallel grooves of any desired cross-section, as indicated, for example, in Figs. 25 and 27 at $n^2$, which are of a length equal to the longest slug to be cast, these grooves being to receive a portion of the molten metal, which will form ribs on the slug engaging the plate $n$, thus insuring the safe withdrawal of the slug from the line of matrices. To remove these ribs, there is formed in the plate $n$ at the point where the inner ends of the groove $n^2$ terminate an opening $n^3$, the farther edge of which is beveled, as at $n^4$, Figs. 17, $17^f$, to form a cutting edge which constitutes the shaving-knife for the under face of the slug, as indicated in the figure last referred to. In this arrangement the edge of the knife $n^4$ is flush with the face of the plate $n$, and consequently the under face of the slug will be smooth and flat, as indicated in Fig. 26. If, however, the shaving is to be done, as sometimes may be required for special reasons, so as to recess a portion of the under face of the slug—as shown, for example, in Figs. 28 and 29—then the knife in the face of the plate $n$ will extend above the face of the plate in the shape shown in Fig. $17^e$ and by dotted lines in Fig. $17^b$ at $n^5$. Under this arrangement the cast slug, owing to its engagement with the plate $n$, might remain at rest thereon while the jaws and their slide move from casting to ejecting position; but any such happening is prevented by the presser-block $f^4$, which as the slide F in which it is carried moves from casting to ejecting position strikes the end of the cast slug and pushes it along to the cutting-knives, by which it is trimmed.

It will be understood that the arrangement just described as being applied to the lower jaw may be applied instead to the upper jaw, or both jaws may be provided with said arrangement. The cutting and trimming devices can also be modified in other ways, and various expedients for imparting movement to the several parts of the slug forming and trimming mechanisms can be provided other than those which I have elected to herein represent in illustration of my improvements, as will be understood without further explanation by those skilled in the art to which the invention relates.

What I claim herein as new and desire to secure by Letters Patent, is as follows:

1. In a line-casting machine and in combination with a carrier for the composed line of matrices, mold-jaws movable one to and from the other, a carrier for said jaws movable to and from the line of matrices, and "setting-tongues" forming the sides of the mold-space of which the jaws form the top and bottom, supported by the matrix-carrier and adapted to enter and withdraw from between the mold jaws, according as the jaw-carrier moves toward or away from the matrices, substantially as and for the purposes hereinbefore set forth.

2. In a line-casting machine and in combination with a carrier for the composed line of matrices, spring-closed mold-jaws movable to and from the line of matrices, setting tongues supported by the matrix-carrier and adapted to enter between the jaws as the jaw-carrier moves toward the line of matrices, means for opening the jaws and holding them open against the stress of the closing spring, and means whereby said opened jaws after the tongues have entered between them, are automatically unlocked and permitted to close upon the tongue, substantially as and for the purposes hereinbefore set forth.

3. In a line-casting machine and in combination with a carrier for the composed line of matrices, a mold-carrying frame movable toward and away from the line of matrices, a slide mounted in and movable lengthwise of said frame, spring-closed mold-jaws mounted in the slide and movable one to and from the other, "setting-tongues" on the matrix-carrier to enter between the jaws as the carrying-frame moves toward the matrices, means for severally actuating the mold-carrying frame and slide to move at the times and in the manner substantially as set forth, means for automatically opening the jaws against the stress of the closing-spring during the movement of their slide from casting to ejecting position and locking them in that position, and means whereby said jaws after their return to casting position and when the mold-carrying frame again moves forward, are automatically unlocked and permitted to close upon the "setting-tongues."

4. In a line-casting machine a mold the top and bottom of which are formed of parallel spring-closed jaws, a jaw carrier in which said jaws are movable in parallel planes to and from one another, and means for holding the jaws open against the stress of their closing-spring, substantially as and for the purposes hereinbefore set forth.

5. In a line-casting machine, a mold the top and bottom of which are formed of parallel spring-closed jaws, a jaw-carrier in which said jaws are movable in parallel planes to and from one another, means for opening the jaws against the stress of their closing-spring, and means for locking them in open position, substantially as and for the purposes hereinbefore set forth.

6. In a linotype-machine, a spring-closed reciprocatory mold, means for moving the mold bodily from casting to ejecting position and return, means for opening the mold against the stress of its closing-spring during its travel from casting to ejecting position, and means for maintaining the mold in open position during its return to casting position, substantially as and for the purposes hereinbefore set forth.

7. In a line-casting machine, and in combination with a holder for the composed line of matrices, a spring-closed mold; "setting-tongues" on the matrix-holder to enter the open mold; means for moving the mold from casting to ejecting position and return; means for opening the mold against the stress of its closing-spring during its travel from casting to ejecting position; means for locking the mold in open position during its travel from ejecting to casting position; and means whereby the open mold after it has returned to casting position and has been entered by the "setting-tongues" is unlocked and permitted to close upon said tongues, substantially as set forth.

8. In a line casting machine, a longitudinally reciprocating mold including a vertically movable member to vary the distance between the upper and lower walls of the mold space or cavity, in combination with an adjustable slug-shaving knife controlled as to its position by the said vertically movable member.

9. In a line-casting machine a mold-carrying frame, a slide mounted and movable lengthwise in said frame, a mold comprising top and bottom jaws mounted in said slide and movable one to and from the other so as to close and open the mold, and a shaving-knife mounted in the mold-carrying frame and slidably engaging a thus-movable jaw so as to partake of its opening and closing movements only, substantially as hereinbefore set forth.

10. In a line-casting machine and in combination with a carrier for the composed line of matrices, a mold-carrying frame, a slide mounted in and movable lengthwise, in said frame and means for moving said slide, mold-jaws mounted in said frame and movable to and from one another, shaving-knives mounted in the mold-carrying frame, and slidably engaging the mold-jaws, so as to partake of their opening and closing movements only, substantially as and for the purposes hereinbefore set forth.

11. In a line-casting machine, a mold the top and bottom of which are formed of jaws movable to and from one another, a slide in which said jaws are mounted, a frame in which said slide is mounted and lengthwise movable, a plate mounted in said frame so as to be capable of down-and-up motion only, and slidably engaging one of the mold-jaws so as to partake of its opening and closing movement, and shaving-knives carried by said plate for trimming the front, rear and face of the slug held between the jaws, as the jaw-slide moves from casting to ejecting position, substantially as and for the purposes hereinbefore set forth.

12. In a line casting machine and in combination with a carrier for the composed line of matrices, a mold and mold-carrier, a melting-pot movable toward and away from the mold-carrier and the line of matrices, and spring yielding connections between the melting-pot and mold-carrier whereby the melting-pot is caused to advance and retract the mold-carrier to and from the line of matrices, and, in its forward movement, to exert a yielding pressure to hold the open front end of the mold against the line of matrices, and to seat its mouth or discharge-spout against the open rear end of the mold, substantially as and for the purposes hereinbefore set forth.

In testimony whereof I affix my signature in presence of two witnesses.

F. C. LUCKE D'AIX.

Witnesses:

FREDERICK E. KESSINGER,
GUERNSEY R. JEWETT.